(12) United States Patent
Lu

(10) Patent No.: US 8,085,777 B2
(45) Date of Patent: Dec. 27, 2011

(54) PACKET-PROCESSING APPARATUS AND METHOD

(75) Inventor: Kuo-Cheng Lu, Hsinchu (TW)

(73) Assignee: Ralink Technology Corporation, Science-Based Park, Hsinchu (TW)

( * ) Notice: Subject to any disclaimer, the term of this patent is extended or adjusted under 35 U.S.C. 154(b) by 344 days.

(21) Appl. No.: 12/230,075

(22) Filed: Aug. 22, 2008

(65) Prior Publication Data

US 2009/0052456 A1 Feb. 26, 2009

(30) Foreign Application Priority Data

Aug. 24, 2007 (TW) .............................. 96131335 A

(51) Int. Cl.
*H04L 12/56* (2006.01)
(52) U.S. Cl. ...................................................... 370/392

(58) Field of Classification Search .................. None
See application file for complete search history.

(56) References Cited

U.S. PATENT DOCUMENTS

| | | | |
|---|---|---|---|
| 5,920,705 A * | 7/1999 | Lyon et al. ..................... 709/240 |
| 6,763,018 B1 * | 7/2004 | Puthiyandyil et al. ........ 370/352 |
| 2004/0066749 A1 * | 4/2004 | Watanabe ..................... 370/242 |

* cited by examiner

*Primary Examiner* — Yong Zhou
(74) *Attorney, Agent, or Firm* — Winston Hsu; Scott Margo

(57) ABSTRACT

The present invention provides a packet-processing apparatus for receiving and processing N packets in a series, wherein N is a natural number, and each of the packets has a current header. Additionally, the packet-processing apparatus includes an agent, a processing unit, a monitoring unit, a lookup table, and a control unit. Particularly, the packet-processing apparatus according to the invention can process the N packets effectively and flexibly.

33 Claims, 4 Drawing Sheets

| established header | processed header | count | rate | time for not receiving packets | flag | state |
|---|---|---|---|---|---|---|
| first established header A | first processed header A | 0 | 0 | 0 | 0 | N/A |
| first established header B | first processed header B | 0 | 0 | 0 | 0 | N/A |
| . . . | . . . | . . . | . . . | . . . | . . . | . . . |

FIG. 4A

| series number | established header | processed header | count | rate | time for not receiving packets | flag | state |
|---|---|---|---|---|---|---|---|
| 1 | first established header A | first processed header A | 1,000 | 100 | 100 | 0 | established |
| 2 | second established header A | N/A | 10 | 1 | 3 | 0 | establishing |
| 3 | N/A | N/A | 0 | 0 | 1 | 0 | unestablished |
| 4 | second established header B | second processed header B | 100 | 100 | 0 | 1 | established |
| 5 | second established header C | second processed header C | 1,000 | 50 | 5 | 0 | finishing |
| . . . | . . . | . . . | . . . | . . . | . . . | . . . | . . . |

FIG. 4B

PACKET-PROCESSING APPARATUS AND METHOD

BACKGROUND OF THE INVENTION

1. Field of the Invention

The present invention relates generally to a packet-processing apparatus and method, and more particularly, to a packet-processing apparatus with an agent and packet-processing method thereof.

2. Description of the Prior Art

Because of the development in technology and the demands from users, transmitting speed of the internet interface has been raised continuously. For example, the transmission rate of the wired local area network has already reached 1,000 Mbps and even 10 Gbps; while the transmission rate of the wireless local area network has also been developed from lower rate used in accordance with IEEE 802.11b to IEEE 802.11a/g and the even higher rate used in accordance with 802.11n standard; moreover, the wide area network has developed from 9,600 bps to the asymmetric digital subscriber line with the transmission rate of 8 Mbps and the very high data rate digital subscriber line with the transmission rate of 50 Mbps.

At the same time, with the increase of transmission rate of the internet, more applications or services based on the internet have been developed, such as voice over IP (VoIP), multimedia streaming, and multi-media on demand (MOD). These aim to provide our lives with more convenience, fulfillment, and safe service. However, said applications also cause the increased loading of internet equipments such as router, gateway, and servers.

Take a conventional router as an example, as shown in FIG. 1; it includes an input interface 21, a processing unit 23, and an output interface 25. The processing path of the router 2 is shown as the lines with arrow in FIG. 1. The packet is received by the input interface 21, processed by the processing unit 23, and output by the output interface 25, and is then transmitted to the destination. Please note that, in the prior art, the processing unit 23 is mostly a CPU, and the packet is processed by the processing unit 23 through software format. Therefore, when the router processes some of the above-mentioned application services and transmits the packets with high flow rate simultaneously, the service quality and efficiency are often reduced because of insufficient processing ability and overloading.

Accordingly, a router with offloading mechanism is developed, as shown in FIG. 2, which mainly includes an input interface 31, a processing unit 33, and an output interface 35. Furthermore, the router includes a lookup table 37 and an agent 39. The router 3 first establishes the lookup table 37, such as ACL, ARP, and NAPT, and then the agent 39 checks the lookup table 37 to process the packets to offload the loading of the processing unit 33. In the prior art, the establishing of lookup table can be performed by software (processing unit) or hardware circuit.

However, when a lookup table is established by software, the software engineer needs to spend a lot of time tracing the program codes to search for a suitable location for writing the codes established by the lookup table. Usually, there are more than one suitable locations dispersed in the whole program. The program code needs to be edited every time when a different CPU is used. Moreover, when processing the program codes edited by different software engineers, it takes a lot of time and labor to trace or rewrite the codes because of different habits of the engineers.

Furthermore, when the lookup table is established by hardware, certain logical circuits have to be first burned into the hardware, and then the hardware can establish the lookup table during the processing of packets based on the logical circuits. Although said method can increase the efficiency of packet processing, the content of lookup table is limited by the inflexible hardware circuits, and exceptions might happen to affect the processing accuracy and efficiency. Furthermore, because of the inflexible hardware circuits, the equipment provider can not add new functions to an existed hardware except to develop new hardware circuits, so that the cost is increased.

In summary, the development of a router or a pocket-processing apparatus with high processing efficiency and flexibility is necessary.

SUMMARY OF THE INVENTION

Accordingly, one aspect of the present invention is to provide a packet-processing apparatus with an agent. Particularly, the packet-processing apparatus of the invention has higher processing efficiency and flexibility, thus also raising the service quality.

According to a preferred embodiment of the invention, the packet-processing apparatus is applied for receiving and processing N packets in a series. N is a natural number, and each of the N series packets has a current header. In addition, the packet-processing apparatus includes an agent, a processing unit, a monitoring unit, a lookup table, and a control unit.

The agent is used for sequentially receiving each of the N packets, and determining if the current header of the packet matches with one of a plurality of first established headers stored in the lookup table and with one of a plurality of first processed headers corresponding to the first established header.

When the agent determines the current header matches with the first established header and the corresponding first processed header, the agent selectively intercepts the packet in accordance with a first criterion and outputs the packet in accordance with the first processed header corresponding to the first established header.

On the other hand, when the agent determines the current header does not match with any of the first established headers, the agent stores the current header of the packet in the lookup table to be a second established header, labels an index to the second established header, and then delivers the packet.

The processing unit is coupled to the agent for receiving the packet from the agent, changing the current header of the packet into a second processed header, and outputting the packet in accordance with the second processed header.

The monitoring unit is coupled to the lookup table, the agent, and the processing unit respectively; it is used for intercepting the packet from the processing unit, for selectively storing the second processed header of the packet according to a second criterion in the lookup table to correspond to the second established header in accordance with the index, and for outputting the packet through the agent.

The lookup table is coupled to the agent and the monitoring unit respectively, and it is used for storing the second established header delivered by the agent and for storing the second processed header corresponding to said second established header delivered by the monitoring unit. Additionally, the control unit is coupled to the lookup table for periodically refreshing the content of the lookup table.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 4A illustrates a lookup table according to an embodiment of the invention.

FIG. 4B illustrates a lookup table according to an embodiment of the invention.

DETAILED DESCRIPTION OF THE INVENTION

The invention provides a packet-processing apparatus and method with high efficiency and flexibility. The preferred embodiment and examples of the invention will be illustrated bellow to fully describe the characters, spirits, and advantages of the invention.

According to a preferred embodiment, the packet-processing apparatus of the invention receives and processes N packets in a series. N is a natural number, such as but not limited to 15, 50, 100, and 500, and each of the N series packets has a current header. In addition, the packet-processing apparatus includes an agent, a processing unit, a monitoring unit, a lookup table, and a control unit.

Figure 1:
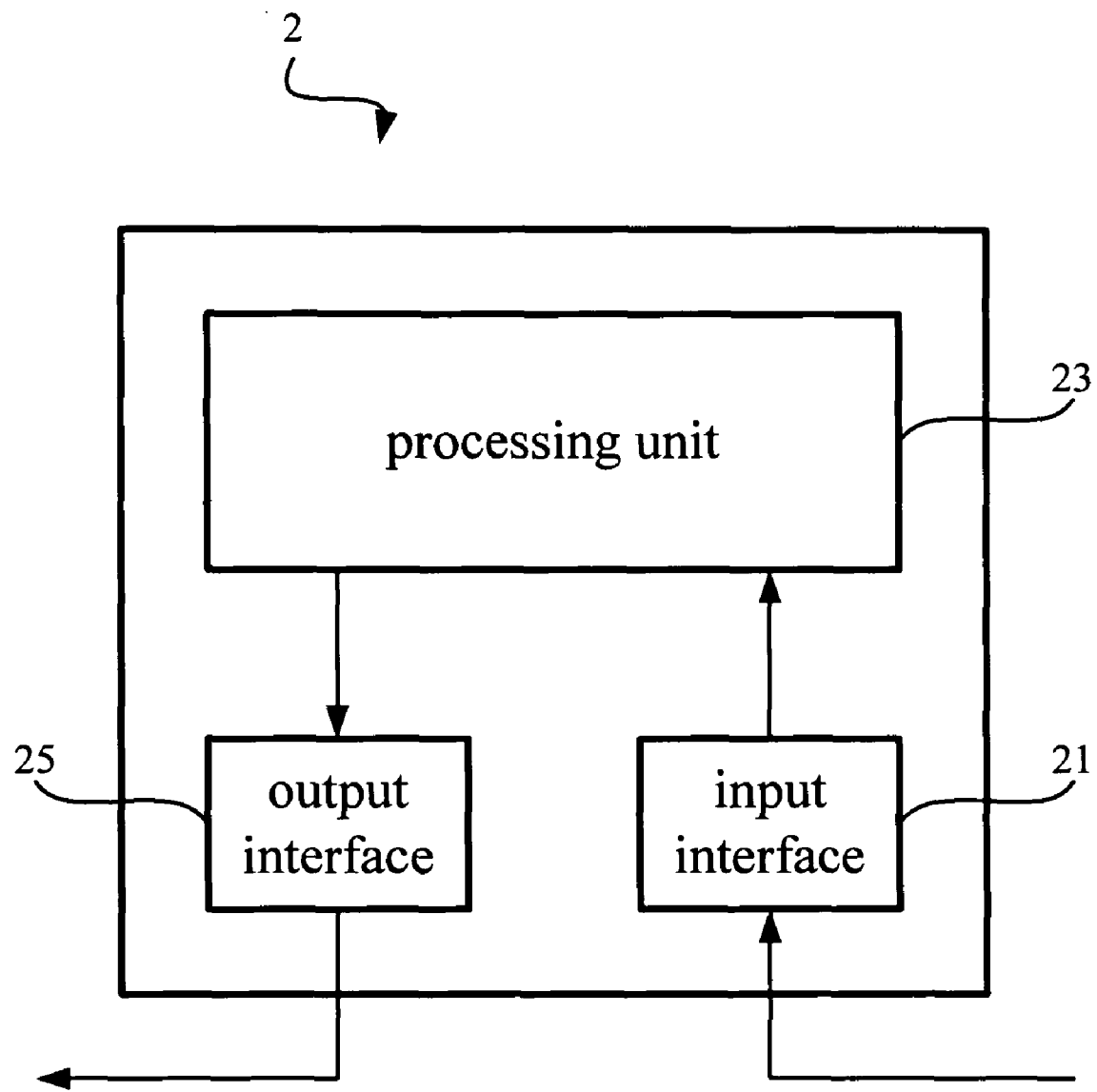
FIG. 1 is a functional block diagram of a packet-processing apparatus of the prior art.
Figure 2:
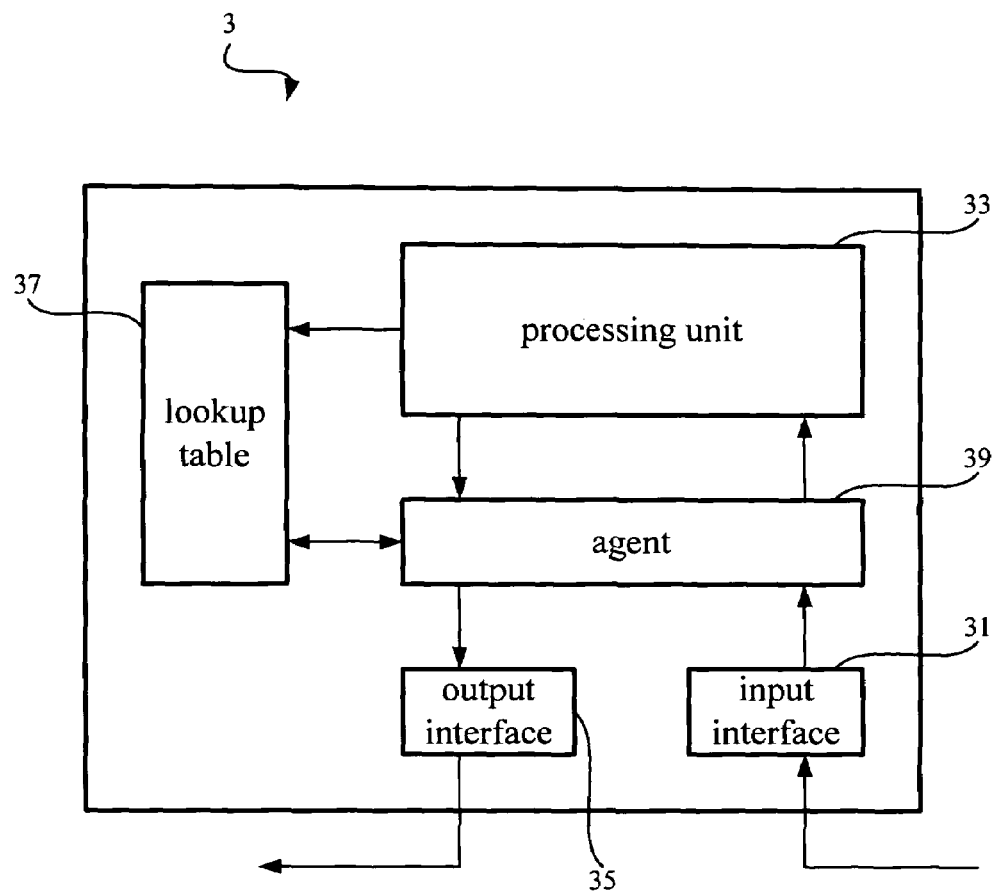
FIG. 2 is a functional block diagram of a packet-processing apparatus of the prior art.
Figure 3:
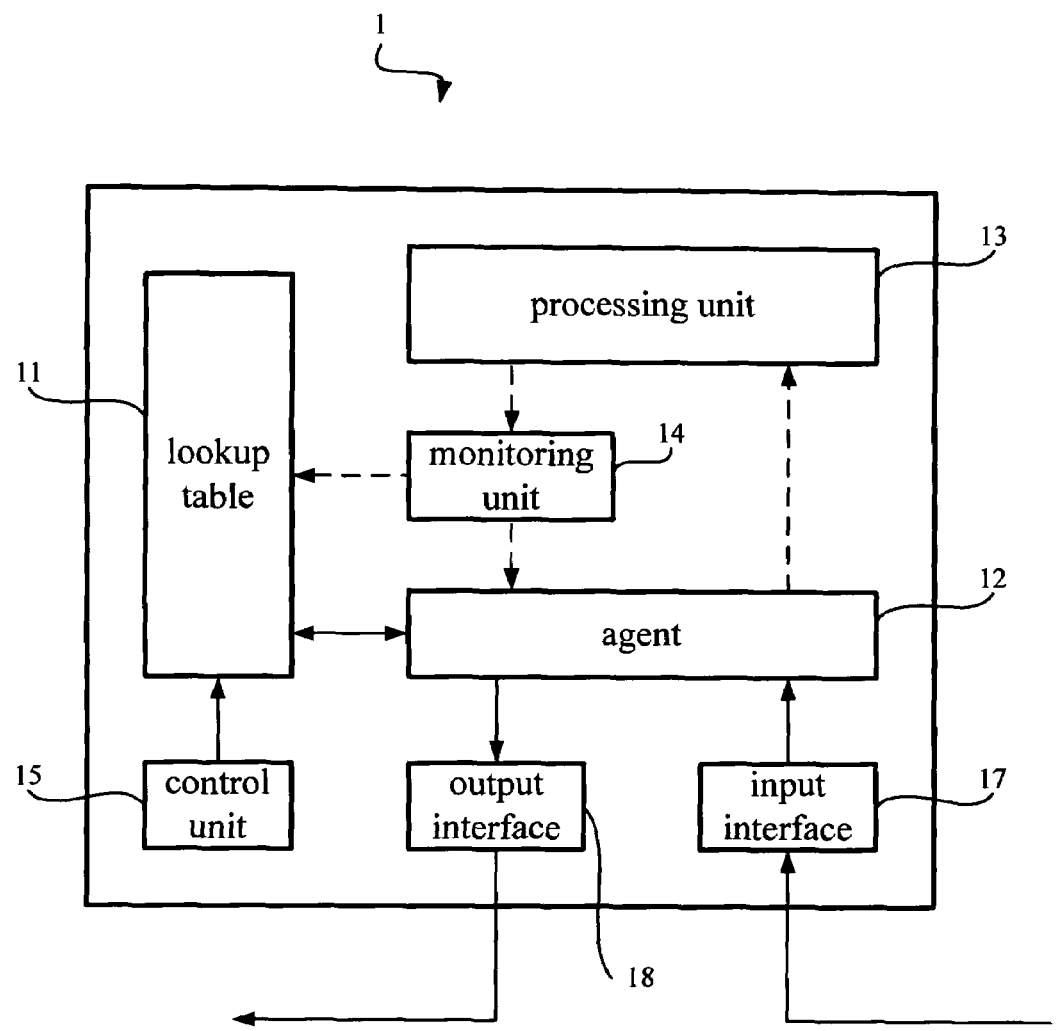
FIG. 3 is a functional block diagram of a packet-processing apparatus of an embodiment of the invention.

Please refer to FIG. 3, which is a functional block diagram of a packet-processing apparatus of an embodiment of the invention. In the embodiment, the packet-processing apparatus 1 includes the above-mentioned agent 11, processing unit 12, monitoring unit 13, lookup table 14, and control unit 15. Furthermore, in the embodiment, the packet-processing apparatus 1 also includes an input interface 17 and an output interface 18.

The lookup table 14 stores a plurality of first established headers and a plurality of first processed headers, each of which corresponds to one of the first established headers.

Furthermore, the agent 11 sequentially receives each of the N packets, and determines if the current header of the packet matches with one of a plurality of first established headers stored in the lookup table 14 and one of a plurality of first processed headers corresponding to the first established header. When the agent 11 determines the current header matches with the first established header and the corresponding first processed header, the agent 11 selectively intercepts the packet in accordance with a first criterion and outputs the packet in accordance with the first processed header corresponding to the first established header.

On the other hand, when the agent 11 determines the current header does not match with any of the first established headers, the agent 11 stores the current header of the packet in the lookup table 14 as a second established header, labels an index to the second established header, and then delivers the packet. The agent 11 can be an application specific integrated circuit (ASIC).

Please notice that the term "interception" refers to the agent receiving the packet and further processing the packet.

The processing unit 12 is coupled to the agent 11 for receiving the packet from the agent 11, for changing the current header of the packet into a second processed header, and for outputting the packet in accordance with the second processed header. The processing unit 12 can be a programmable hardware, such as a central processing unit (CPU).

The monitoring unit 13 is coupled to the lookup table 14, the agent 11, and the processing unit 12 respectively. The monitoring unit 13 can intercept the packet sent from the processing unit 12, selectively store the second processed header of the packet according to a second criterion in the lookup table 14 to correspond to the second established header in accordance with the index, and output the packet through the agent 11.

In the embodiment, the lookup table 14 is coupled to the agent 11 and the monitoring unit 13 respectively, for storing the second established header delivered by the agent 11 and the second processed header corresponding to said second established header delivered by the monitoring unit 13. The lookup table 14 can be, but not limited to, a volatile random access memory (VRAM) or a non-volatile random access memory (NVRAM).

Furthermore, the control unit 15 is coupled to the lookup table 14 for periodically refreshing the content of the lookup table 14.

Moreover, the input interface 17, such as a network interface card (NIC), is coupled to the agent 11 for receiving the N packets from the internet. The output interface 18 can also be an NIC and also be coupled to the agent 11, for outputting the packets processed by the agent 11 or the processing unit 12 to the internet and for delivering to the destination. The input interface 17 and the output interface 18 can be integrated in the same NIC.

Also shown in FIG. 3, the packet-processing apparatus 1 of the invention processes the packets through two major paths. The first path is shown as the solid line with arrow in FIG. 3. The agent 11 receives the N packets through the input interface 17, intercepts one of the N packets, searches the lookup table 14, and outputs the intercepted packet through the output interface 18 in accordance with the first processed header corresponding to the first established header that matches with the current header of the intercepted packet.

The second path of the packet-processing apparatus 1 of the invention is shown as the dotted line with arrow in FIG. 3. The agent 11 also receives the N packets through the input interface 17, intercepts one of the N packets, stores the current header of the intercepted packet in the lookup table 14 to be a second established header, marks an index to the second established header in the lookup table 14, and embeds the index in the intercepted packet. Afterward, the agent 11 delivers the intercepted packet to the processing unit 12. Then, the processing unit 12 changes the current header of the packet to a second processed header and output the packet in accordance with the second processed header. The monitoring unit 13 intercepts the packet from the processing unit 12 and stores the second processed header of the packet in the lookup table 14 according to the index to correspond to the second established header, and outputs the packet through the agent 11 and then through the output interface 18.

Please refer to FIG. 4A, which illustrates a lookup table according to an embodiment of the invention. As shown in FIG. 4A, contents of the lookup table of the present invention can include established header, processed header, count of the N packets, rate of the agent receiving the N packets, time for the agent not receiving any packet, periodic flag, and state of the N packets. Please note that the lookup table of FIG. 4A is under the situation that the packet-processing apparatus has not received any packet; therefore, all the established headers stored therein are the pre-stored first established headers, whereas all the processed headers are the pre-stored first processed headers. Additionally, the lookup table can include other contents and not limited to the above-mentioned contents.

During the operation of internet, every N packets form a data stream. In an embodiment, the packet-processing apparatus can give each data stream a series number. The series number is stored in the lookup table, and the information related to the packets of the data stream is stored in the lookup table at a location corresponding to the series number. Please further refer to FIG. 4B. FIG. 4B illustrates a lookup table according to an embodiment of the invention. Please note that the lookup table of FIG. 4B is under the situation that the packet-processing apparatus has begun to receive the packets; therefore, some of the second established headers (see the rows with series number 2 and 4) and second processed headers (see the row with series number 4) related to certain packets have been stored.

The above-mentioned headers (including established headers and processed headers) contain multi-level headers, such as the second level headers, the third level headers, and the fourth level headers. Furthermore, the second level header can include the destination MAC address and the source MAC address; the third level headers can include the source IP address and the destination IP address, and the fourth level headers can include the source TCP port number and the destination TCP port number.

The meanings and applications of the above-mentioned contents related to the N packets will be further illustrated below.

In an embodiment, the control unit of the packet-processing apparatus can periodically set a flag in the lookup table (see the row with series number 4 of FIG. 4B), and the flag corresponds to the series number and the first established header or the second established header.

The first criterion includes that when the flag is present, the agent will not intercept the packet. The mechanism is used to prevent the processing unit from erroneously determining the data stream as finished because of not processing the packets of the data stream for too long, and it may even perform wrong processing. Furthermore, the last packet of the N packets of the data stream has to be sent to and processed by the processing unit to remind the processing unit of the finish of the packets, so as to let the processing unit perform related processes. Obviously, compared with the prior, the application of the above-mentioned mechanism of the invention can effectively reduce the time and labor spent on modifying the program codes.

Please note that the above mechanism is only used to remind the processing unit about the existence of the N packets; therefore, when the agent does not intercept M packets, the agent clears the flag and continuously intercepts the following packets to speed up the processing of packets. M is a natural number, such as but not limited to 5, 10, 30, 50, and 100.

Furthermore, when the control unit periodically sets the flag in the lookup table, the first criterion includes that when the flag is present, the agent intercepts the packet. After the interception, the agent outputs the packet in accordance with the first processed header matching with the current header of the packet. At the same time, the agent copies the intercepted packet, embeds the flag into the copied packet, and delivers the intercepted packet to the processing unit. Furthermore, the second criterion includes that when the monitoring unit receives the copied packet with the flag, the monitoring unit does not store the second processed header of the copied packet in the lookup table in accordance with the index.

Moreover, the monitoring unit deletes the copied packet to prevent the copied packet from being delivered.

Please note that the above-mentioned first criteria are not limited to the ones described in the invention; therefore, the first criteria can include other suitable criteria. In addition, the first criterion can further be strategically established in accordance with the information contained in the packet, such as port number, protocol type, the source IP address, and other information.

In another embodiment, a count value related to the N packets is recorded in the lookup table by the agent; the count value also corresponds to the series number of the N packets, and the first established header or the second established header. Furthermore, the second criterion comprises that when the count value is larger than a pre-defined value, the monitoring unit stores the second processed header of the packet in the lookup table to correspond to the second established header of the packet in accordance with the index. In other words, the count value larger than the pre-defined value implies that the N packets could be packets with high flow rate, such as video file or audio file, so there is a need for the agent to share the loading of the processing unit, and the storage of the second processed header is necessary. On the contrary, the count value smaller than the pre-defined value implies that the N packets could be packets with low flow rate, such as text file or control signal, so there is no need of the agent to share the loading of the processing unit, and the storage of the second processed header is unnecessary. Through the mechanism as described above, the packet-processing apparatus can perform the division of labor effectively and can process packets of different types with suitable processing modules.

Additionally, in an embodiment, a rate for the packet-processing apparatus to receive the N packets is recorded; the rate can be a count of the N packets within a unit time. The rate is calculated by the control unit clearing the count of the N packets to zero within a unit time; therefore, a larger count value represents that more packets are received by the packet-processing apparatus within the unit time. Moreover, in the embodiment, the second criterion includes that when the rate is higher than a pre-determined value, the monitoring unit stores the second processed header of the packet, which corresponds to the second established header of the packet, in the lookup table in accordance with the index. In other words, when the packet-processing apparatus receives more than a certain number of packets within the unit time, there is a need for the agent to help the processing unit to process the packets; therefore, the second processed header of the packet has to be stored in the lookup table, so as to let the agent process the following packets in accordance with the second processed header.

In another embodiment, a time for the processing unit not receiving the packets is recorded and stored in the lookup table. When the time is longer than a pre-determined value, the transmission of the N packets is interrupted, and the monitoring unit removes the content corresponding to the N series packets in the lookup table.

To continue, the different states related to the N packets are also recorded and stored by the agent in the lookup table. Particularly, the pre-determined time value is corresponded to the states. For example, as shown in FIG. 4B, the states can include but not be limited to "unestablished", "establishing", "established", and "finishing".

Additionally, the state "unestablished" refers to the agent just receiving the first packet of the N packets; therefore, there is no information related to the N packets stored in the lookup table (see the row with series number 3). Furthermore, the state "establishing" refers that the agent has received and intercepted some of the N packets, but the count value of the N packets or the rate of the agent receiving the N packets has not reached the pre-determined value yet; therefore, the current header of the intercepted packets has been stored in the lookup table to be a second established header, but the monitoring unit has not stored the corresponding second processed header in the lookup table (see the row with series number 2).

Moreover, the state "established" refers that the agent has received and intercepted some of the N packets, and both of the current header and corresponded processed header have been stored in the lookup table (see the row with series number 4); therefore, the agent can process other packets of the N packets in accordance with the contents of the lookup table. Alternatively, "established" refers that the agent has received and intercepted some of the N packets, and the current header of the packets matches with one of the first established header and the corresponding first processed header; therefore, the agent can process other packets of the N packets in accordance with the contents of the lookup table.

Furthermore, the state "finishing" (see the row with series number 5) refers that the agent has received the last packet of the N packets. Moreover, the pre-determined value of the time for the agent not receiving packets of this state is set to be smaller than that of the above-mentioned states.

During the processing of the packets, the packets of the application level gateway (ALG) stream need to be processed by a complicated process by the processing unit. Therefore, related information should not be established in the lookup table to prevent the agent from intercepting the ALG packets. Most of the mechanisms of the prior art determine the ALG stream in accordance with the receiving rate of the packets; when the receiving rate is higher than a pre-determined value, those mechanisms determine the stream is not an ALG stream. However, said mechanisms are too subjective and not accurate enough.

Accordingly, the packet-processing apparatus of the invention further provides accurate determining mechanism for ALG packets to improve the above-mentioned problems.

In an embodiment, when the aforementioned agent determines the current header of the packet does not match with any of the first established headers, the agent calculates a first checksum of the payload of the packet and embeds the first checksum in the packet. Moreover, after the monitoring unit receives the packets already processed by the processing unit, it selectively calculates a second checksum of the payload of the packet and compares the first checksum and the second checksum. When the first checksum is not equal to the second checksum, the monitoring unit does not store the second processed header of the packet in the lookup table in accordance with the index (second criterion).

In another embodiment, when the processing unit receives the packet from the agent, the processing unit selectively modifies the payload of the packet and inserts a modified mark in the packet. Furthermore, when the monitoring unit receives the packet from the processing unit, it confirms the payload of the packet. When the packet includes the modified mark, the monitoring unit does not store the second processed header of the packet in the lookup table in accordance with the index (second criterion).

In yet another embodiment, the packet-processing apparatus of the invention can applies both of the above-mentioned mechanisms or other mechanisms to accurately determine ALG packet.

Please note that the above-mentioned second criteria are only used to describe but not limited to the invention; therefore, the second criteria can include other suitable criteria. In addition, the second criterion can further be strategically established in accordance with the information contained in the packet, such as port number, protocol type, the source IP address, and other information.

Obviously, compared with the prior art, the packet-processing apparatus of the invention can process packets more effectively and flexibly because of the monitoring unit and the agent, and the application of the first and second criteria. Additionally, the packet-processing apparatus of the invention can reduce the development time and labor when updating the hardware, such as processing unit.

Although the present invention has been illustrated and described with reference to the preferred embodiment thereof, it should be understood that it is in no way limited to the details of such embodiment but is capable of numerous modifications within the scope of the appended claims.

What is claimed is:

1. A packet-processing apparatus, for receiving and processing N packets in a series, each of the N series packets having a current header, N being a natural number, the packet-processing apparatus comprising:

an agent controller, for sequentially receiving each of the N packets and determining if the current header of the packet matches with one of a plurality of pre-stored first established headers which corresponds to one of a plurality of pre-stored first processed headers, and if yes, the agent controller selectively intercepts the packet in accordance with a first criterion and outputs the packet to an output interface in accordance with the first processed header corresponding to the first established header matched, and if no, the agent controller stores the current header of the packet as a second established header, labels an index to the second established header, and delivers the packet for further processing;

a processing unit, coupling to the agent controller, for receiving the packet from the agent controller, changing the current header of the packet into a second processed header, and outputting the packet to the output interface in accordance with the second processed header;

a monitoring unit, coupling to the agent controller, and the processing unit respectively, for intercepting the packet from the processing unit, selectively storing the second processed header of the packet corresponding to the second established header in accordance with the index based on a second criterion, and outputting the packet through the agent controller;

a lookup table, coupling to the agent controller and the monitoring unit respectively, for storing the plurality of first established headers and the plurality first processed header corresponding to the first established headers, the second established header delivered by the agent controller and the second processed header corresponding to said second established header delivered by the monitoring unit; and a control unit, coupling to the lookup table, for periodically refreshing the content of the lookup table and setting a flag in the lookup table corresponding to a series number, wherein the flag is part of the first and second criteria.

2. The packet-processing apparatus of claim 1, wherein the flag corresponds to the first established header or the second established header, and the first criterion comprises that when the flag is present, the agent controller does not intercept the packet.

3. The packet-processing apparatus of claim 2, wherein when the agent controller does not intercept M packets, the agent controller clears the flag, M being a natural number.

4. The packet-processing apparatus of claim 1, wherein the flag corresponds to the current header of the packet, and the first criterion comprises that when the flag is present, the agent controller intercepts the packet.

5. The packet-processing apparatus of claim 4, wherein when the agent controller intercepts the packet, the agent controller copies the packet and embeds the flag into the copied packet, and delivers the packet to the processing unit.

6. The packet-processing apparatus of claim 5, wherein the second criterion comprises that when the monitoring unit receives the copied packet with the flag, the monitoring unit does not store the second processed header of the copy packet in the lookup table in accordance with the index, and deletes the copy packet.

7. The packet-processing apparatus of claim 1, wherein a count value related to the N packets is recorded, and the second criterion comprises that when the count value is larger than a pre-defined value, the monitoring unit stores the second processed header of the packet in the lookup table in accordance with the index.

8. The packet-processing apparatus of claim 1, wherein a rate for the packet-processing apparatus receiving the N packets is recorded, and the second criterion comprises that when the rate is larger than a pre-determined value, the monitoring unit stores the second processed header of the packet in the lookup table in accordance with the index.

9. The packet-processing apparatus of claim 8, wherein the rate is a count of the N packets within a unit time.

10. The packet-processing apparatus of claim 1, wherein when the agent controller determines the current header of the packet does not match with any of the first established headers, the agent controller calculates a first checksum of the payload of the packet and embeds the first checksum in the packet, and the monitoring unit selectively calculates a second checksum of the payload of the packet and compares the first checksum and the second checksum.

11. The packet-processing apparatus of claim 10, wherein the second criterion comprises that when the first checksum is not equal to the second checksum, the monitoring unit does not store the second processed header of the packet in the lookup table in accordance with the index.

12. The packet-processing apparatus of claim 1, wherein when the processing unit receives the packet from the agent controller, the processing unit selectively modifies the payload of the packet and inserts a modified mark in the packet.

13. The packet-processing apparatus of claim 12, wherein the second criterion comprises that when the packet includes the modified mark, the monitoring unit not stores the second processed header of the packet in the lookup table in accordance with the index.

14. The packet-processing apparatus of claim 1, wherein a time for the processing unit not receiving the packets is recorded, and when the time is larger than a pre-determined value, the monitoring unit clears the content of the lookup table.

15. The packet-processing apparatus of claim 14, wherein a state related to the N packets is recorded, and the pre-determined value corresponds to the state.

16. The packet-processing apparatus of claim 1, wherein the lookup table is implemented to a volatile random access memory (VRAM) or a non-volatile random access memory (NVRAM).

17. The packet-processing apparatus of claim 1, further comprising at least an input interface, and the agent controller receiving the N packets through the input interface.

18. The packet-processing apparatus of claim 1, further comprising at least an output interface, and the agent controller outputting the N packets through the output interface.

19. A packet-processing method, for receiving and processing N packets in a series, each of the N series packets having a current header, N being a natural number, the packet-processing method comprising the following steps:
(a) establishing a lookup table comprising a plurality of first established headers and a plurality of first processed headers, wherein each of the first processed headers corresponds to one of the first established headers, wherein the established header relates to the header of an inputted packet and the processed header relates to the header of an outputted packet;
(b) sequentially receiving each of the N packets and determining if the current header of the packet being matched with one of the stored first established headers which corresponds to one of the stored first processed headers;
(c) if the result of step (b) is yes, selectively intercepting the packet in accordance with a first criterion and outputting the packet to an output interface in accordance with the first processed header corresponding to the first established header matched;
(d) if the result of step (b) is no, storing the current header of the packet in the lookup table to be a second established header, labeling an index to the second established header, and delivering the packet for further processing;
(e) receiving the packet from step (d), changing the current header of the packet into a second processed header, and outputting the packet to the output interface in accordance with the second processed header; and
(f) intercepting the packet from step (e), selectively storing the second processed header of the packet in the lookup table corresponding to the second established header in accordance with the index based on a second criterion, and outputting the packet;
(g) periodically refreshing the content of the lookup table and setting a flag in the lookup table corresponding to a series number by a control unit coupled to the lookup table, wherein the flag is part of the first and second criteria.

20. The packet-processing method of claim 19, further comprising:
the flag being corresponding to the first established header or the second established header;
wherein the first criterion comprising that when the flag is present, not intercepting the packet.

21. The packet-processing method of claim 20, further comprising the following step:
clearing the flag after not intercepting M packets, M being a natural number.

22. The packet-processing method of claim 19, further comprising:
the flag being corresponding to the current header of the packet;
wherein the first criterion comprising that when the flag is present, intercepting the packet.

23. The packet-processing method of claim 22, wherein step (c) further comprises the following steps:
intercepting and copying the packet;
embedding the flag into the copied packet; and
delivering the packet.

24. The packet-processing method of claim 23, wherein the second criterion comprises that when the copied packet with the flag is received in step (f), not storing the second processed header of the copy packet in the lookup table, and deleting the copy packet.

25. The packet-processing method of claim 19, further comprising the following steps:
recording a count value related to the N packets;
wherein the second criterion comprises that when the count value is larger than a pre-defined value, storing the second processed header of the packet in the lookup table in accordance with the index.

26. The packet-processing method of claim 19, further comprising the following steps:
recording a rate for the packet-processing apparatus receiving the N packets;
wherein the second criterion comprises that when the rate is larger than a pre-determined value, storing the second processed header of the packet in the lookup table in accordance with the index.

27. The packet-processing method of claim 26, wherein the rate is a count of the N packets within a unit time.

28. The packet-processing method of claim 19, further comprising the following steps:
(d') if the result of step (b) is no, calculating a first checksum of the payload of the packet and embedding the first checksum in the packet; and
(f') selectively calculating a second checksum of the payload of the packet and comparing the first checksum and the second checksum.

29. The packet-processing method of claim 28, wherein the second criterion comprises that when the first checksum is not equal to the second checksum, not storing the second processed header of the packet in the lookup table.

30. The packet-processing method of claim 19, wherein step (e) further comprising the following steps:
selectively modifying the payload of the packet and inserting a modified mark in the packet.

31. The packet-processing method of claim 30, wherein the second criterion comprises that when the packet includes the modified mark, not storing the second processed header of the packet in the lookup table.

32. The packet-processing method of claim 19, wherein step (e) further comprising the following steps:
recording a time for not receiving the packets; and
when the time is larger than a pre-determined value, clearing the content of the lookup table.

33. The packet-processing method of claim 32, wherein a state related to the N packets is recorded, and the pre-determined value corresponds to the state.

* * * * *